UNITED STATES PATENT OFFICE.

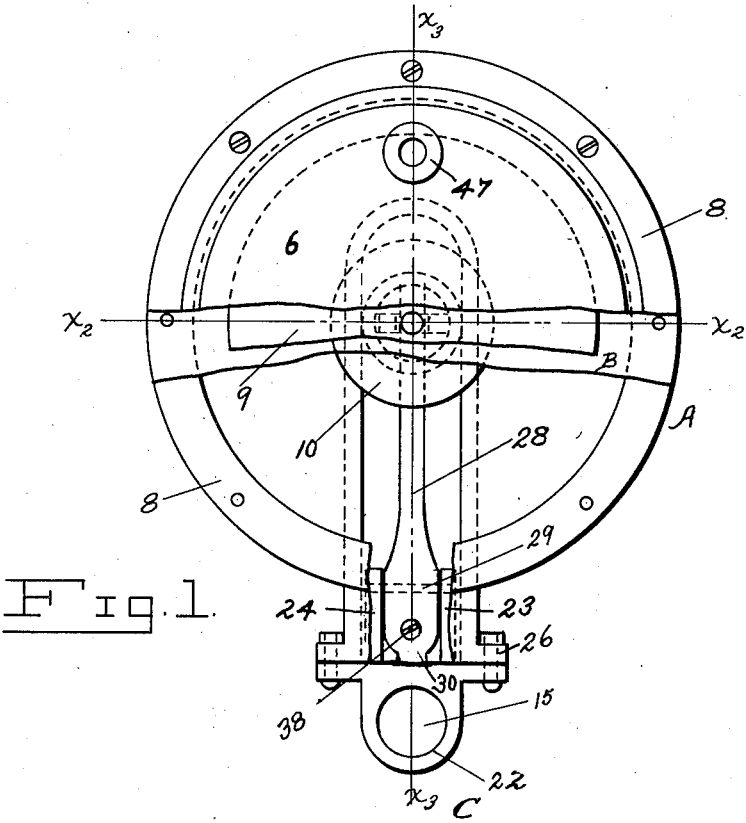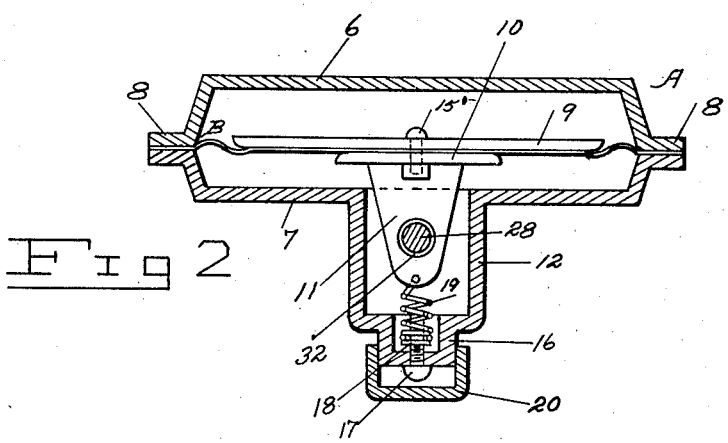

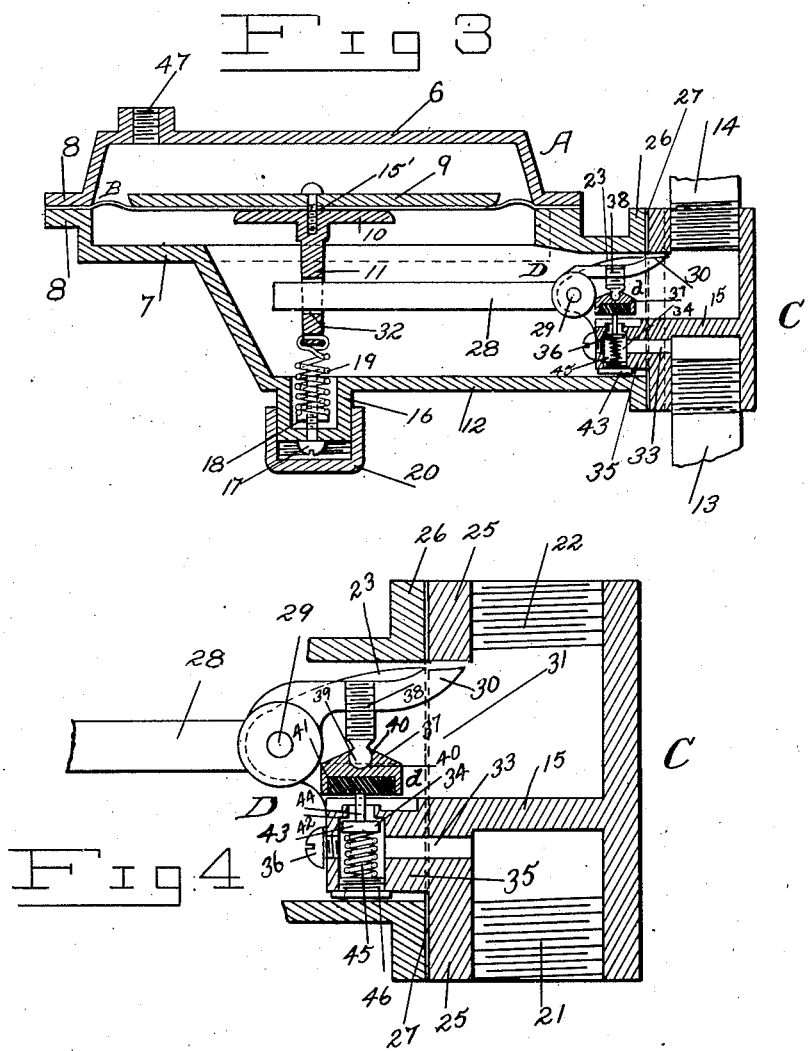

JAMES R. RICKETTS, OF LOS ANGELES, CALIFORNIA, ASSIGNOR TO PERFECTION GAS REGULATOR COMPANY, OF LOS ANGELES, CALIFORNIA, A CORPORATION OF CALIFORNIA.

GAS-REGULATOR.

1,058,334.   Specification of Letters Patent.   Patented Apr. 8, 1913.

Application filed May 28, 1912. Serial No. 700,228.

*To all whom it may concern:*

Be it known that I, JAMES R. RICKETTS, a citizen of the United States, residing at Los Angeles, in the county of Los Angeles and State of California, have invented new and useful Improvements in Gas-Regulators, of which the following is a specification.

This invention relates to gas regulators whereby the pressure or head of gas provided at the point of consumption may be regulated and maintained even and constant at a predetermined degree. Regulators of the same general nature are employed extensively in connection with the gas service pipes of dwellings and other structures, to the end that the pressure of illuminating gas at the burner tips, in lighting, and at the burners in heating and cooking, may be properly maintained, and the waste and loss incident to unnecessarily high pressure may be obviated.

The present invention has for its object to provide improvements in gas regulators of the general nature stated which will be superior in point of relative simplicity and inexpensiveness in construction and organization, combined with positiveness and efficiency in service and sensitive responsiveness to variations in working conditions;
which will operate for long periods of time without necessitating attention or repair, which will be convenient in installation and connection or disconnection from the main and service pipes, in which the danger of leakage will be substantially eliminated, and which will be generally superior in efficiency and serviceability.

With the above and other objects in view, the invention consists in the provision, formation, construction, combination, association and relative arrangement of parts, members and features, all as hereinafter described, shown in the drawings, and finally pointed out in claims.

In the drawings: Figure 1 is a top plan view partly broken away for clearness of illustration of a gas regulator constructed and organized in accordance with the invention; Fig. 2 is a transverse sectional view of the same taken upon the line $X^2$—$X^2$, Fig. 1; Fig. 3 is a transverse sectional view of the same taken upon the line $X^3$—$X^3$, Fig. 1; and, Fig. 4 is an enlarged transverse sectional view, fragmentary of the showing in Fig. 3.

Corresponding parts in all the figures are denoted by the same reference characters.

Referring with particularity to the drawings, the improved regulator comprises a casing A within which is held a transverse diaphragm B, the casing A preferably having a circular top member 6 and a circular bottom member 7 detachably connected by meeting edge flanges 8, and the diaphragm B being gripped at its edges between the flanges 8. An extended disk weight 9 rests upon the upper surface of the diaphragm, and is clamped to the diaphragm by a plate 10 beneath the diaphragm and from which depends a bracket 11 projecting within a radial extension 12 of the bottom casing member 7 at the outer end of which is a detachable fitting C with which are connected a gas main pipe 13 and a service pipe 14 separated by a wall 15. The weight 9 and plate 10 are jointly clamped to the diaphragm B by a screw 15' or similar securing device, passed through the center of the weight and threaded into the plate 10 and the bracket 11 depending from the same. The bracket 11 depends within the central portion of the casing A, being disposed above a nipple 16 upon the bottom of the casing member extension 12, there being an adjusting screw 17 passed through the lower end of the nipple and carrying an adjusting nut 18 applied to the screw. Between the bracket and the nut 18 extends a contractile coil spring 19. The tension may be varied by turning the screw. A screw cap 20 is applied to the nipple 16 inclosing the head of the screw 17.

The gas pipes 13 and 14 respectively enter chambers 21 and 22 in the fitting, being threaded into the same for ready attachment and detachment; and gas feed control means D regulate the flow of gas from the chamber 21 to the casing A beneath the diaphragm B. Said gas feed control means are operatively connected with the diaphragm B through the bracket 11 upon the plate 10 which bracket rises and falls with the diaphragm in accordance with variations of gaseous pressure beneath the diaphragm. The gas flows from the space beneath the diaphragm into the chamber 22 and thence to the service pipe 14.

The fitting C is provided with spaced cheeks 23 and 24 springing from its forward wall 25 which abuts against and is detachably secured to a flange 26 upon the casing member extension 12, a suitable gasket 27 being disposed between said flange and wall to produce a gas-tight joint. Between these cheeks is supported the inner end of an oscillating arm 28 preferably pivotally supported between said cheeks by a shaft 29 and provided with a rearwardly and upwardly flaring or projecting stop finger 30 disposed in position to be engaged beneath a portion of the front wall 25 which is cut away above the wall 15 to form a gas passage 31 leading to the chamber 22. The stop finger 30 limits downward play of the arm 28 forward of the shaft 29. The forward end of the arm 28 enters an opening 32 in the bracket 11, which opening it loosely fits, and rise or fall of the bracket causes rise or fall of the arm 28 and corresponding fall or rise of the stop finger 30. The chamber 21 communicates with the space beneath the diaphragm and consequently with the chamber 22 through the passage 31, subject to the operation of the gas feed control means, through communicating angularly related gas passages 33 and 34 formed in a head 35 upon the front wall 25 of the fitting C, which head projects within the casing member extension 12. The passage 33 ranges forwardly and the passage 34 ranges upwardly, the former passage being closed at its forward end by a plug 36, and valve means $d$ being provided and operating with respect to the passage 34, and being included within the gas feed control means D. Said valve means $d$ preferably comprise a valve head 37, having swivel connection with and suspended from the stop finger 30, rearward of the shaft 29, by a screw shaft 38 threaded into a suitable bore in said stop finger and having a ball head 39 retained in a socket 40 produced by upsetting the material of the valve head 37 around said head 39. A compressible facing 41 is set into the valve head 37 and is presented to the upper orifice of the gas passage 34 which is flanged as at 42 to retain within the passage 34 a flat valve head 43 having a stem 44 ranging upwardly through the flanged upper orifice of the passage 34 into position to be engaged by the valve head 37. A coil spring 45 is confined between a plug 46 at the lower end of the passage 34 and the valve head 43, urging said valve head upwardly into seated position against the flange 42. The valve head 43 is smaller than the internal diameter of the passage 34 and the stem 44 is of smaller diameter than the flanged orifice of the passage 34. When the valve head 43 is seated such orifice is closed but when it is unseated, by depression of the stem 44, such orifice is open and gas is free to flow from the chamber 21 through the passage 33 and the passage 34 and out therefrom into the space beneath the diaphragm and thence through the passage 31 into the chamber 22, whence it flows to the point of consumption. In the top of the casing member 6 is provided a vent 47 whereby air may flow into and out of the space above the diaphragm in compensation for the rise and fall thereof under variations of gaseous pressure beneath the diaphragm.

The operation, method of use and advantages of the improvements in gas regulators constituting the invention will be readily understood from the foregoing description, taken in connection with the accompanying drawings and the following statement:— The spring 19 is put under proper tension by means of the adjusting nut 18 to cause the diaphragm to hold the bracket 11 at the proper elevation, to hold the arm 28 at such elevation that the valve means $d$ will permit gas to enter the space beneath the diaphragm from the chamber 21, and flow to the chamber 22, when the proper pressure in the service pipe 14 exists. If a higher pressure is desired the spring 19 is put under greater tension; and if a lower pressure is desired the spring 19 is put under a lesser tension, the pressure of gas beneath the diaphragm acting at all times to elevate the diaphragm and the weight thereon against the tension of the spring 19. During the existence of such proper pressure the bracket 11 holds the arm 28 in such position that the valve head 37 is spaced slightly from the orifice of the passage 34, holding the valve 43 unseated through its stem 44, and thus permitting gas to traverse the passages 33 and 34. If for any reason the pressure in the gas main so increases that an undue pressure is set up beneath the diaphragm, and an undue service pressure is produced, the diaphragm rises, swings upwardly the arm 28 and brings the valve head 37 down upon the orifice of the passage 34 effectually closing such passage, although it carries with it and to a greater degree unseats the valve 43. As soon as the pressure falls slightly beneath the diaphragm, the arm 28 swings downwardly, the valve head 37 rises slightly from the orifice of the passage 34, and further gas is admitted beneath the diaphragm and to the service pipe. Ordinarily but slight fluctuations occur in the pressure within the mains, and such slight variations will cause slight elevation and depression of the diaphragm, resultantly spacing the valve head $d$ less far from or farther from the orifice of the passage 34, regulating the flow of gas from said passage so that as the pressure in the main diminishes more gas can enter the space beneath the diaphragm, and as the pressure increases less gas enters the space beneath the diaphragm. The pressure in the chamber 22 and the service pipe leading therefrom is thus regulated and kept constant, in accordance with the standard determined by the degree of tension in the spring 19 which opposes rising and assists depression of the diaphragm. The length of the stem 44 of the valve 43 is so proportioned that the valve 43 will not seat under ordinary working conditions of the regulator. It only seats in case something occurs to disturb the working conditions of the regulator, causing the valve head 37 to rise inordinately high, or to get entirely out of place. Thereupon, the valve 43 will automatically close the orifice of the passage 34 and prevent further flow of gas through the regulator until the latter is repaired. The stop finger 30 prevents the arm 28 from swinging downwardly too far, assisting in assembling the fitting and the casing A, so that the arm 28 readily enters the opening 32. The casing A and the contents thereof are readily detached from the fitting C with the gas feed control means and the arm 28 mounted upon said fitting. The fitting remains connected with the pipes.

I do not desire to be understood as limiting myself to the exact and specific details of construction and formation disclosed and described, further than in any of the appended claims; but reserve the right to vary the same within the scope of the claims and the spirit of the invention.

Having thus described my invention, I claim and desire to secure by Letters Patent:—

1. A gas regulator, comprising a casing provided with a diaphragm spanning the same and producing a chamber in part confined by the diaphragm, and a fitting detachably connected with the casing and carrying in entirety gas feed control means regulating with said diaphragm the flow of gas through said chamber; said fitting being formed with separate chambers to receive a gas main pipe and a gas service pipe, respectively.

2. A gas regulator, comprising a casing provided with a diaphragm spanning the same and producing a chamber in part confined by the diaphragm, and a fitting detachably connected with the casing and carrying in entirety gas feed control means regulating with said diaphragm the flow of gas through said chamber; said fitting being formed with separate chambers to receive a gas main pipe and a gas service pipe, respectively; said gas feed control means comprising valve means operating with respect to a gas passage between one of said chambers in said fitting and said chamber in part confined by said diaphragm, and a member mounted to move said valve means in connection with the diaphragm and operating to move toward and away from the orifice of said gas passage.

3. A gas regulator, comprising a casing provided with a diaphragm spanning the same and producing a chamber in part confined by the diaphragm, and a fitting detachably connected with the casing and carrying in entirety gas feed control means regulating with said diaphragm the flow of gas through said chamber; said fitting being formed with separate chambers to receive a gas main pipe and a gas service pipe, respectively; said gas feed control means comprising valve means operating with respect to a gas passage between one of said chambers in said fitting and said chamber in part confined by said diaphragm, and a member mounted to move in connection with the diaphragm and operating to move said valve means toward and away from the orifice of said gas passage; said last named member comprising a swinging arm provided with a valve head included in said valve means and disposed adjacent to said gas passage orifice.

4. A gas regulator comprising a casing provided with a diaphragm spanning the same and producing a chamber in part confined by the diaphragm, and a fitting detachably connected with the casing and carrying gas feed control means regulating the flow of gas through said chamber; said fitting being formed with separate chambers to receive a gas main pipe and a gas service pipe, respectively; said gas feed control means comprising valve means operating with respect to a gas passage between one of said chambers in said fitting and said chamber in part confined by said diaphragm, and a member mounted to move in connection with the diaphragm and operating to move toward and away from the orifice of said gas passage; said last named member comprising a swinging arm provided with a valve head disposed adjacent to said gas passage orifice; said gas passage being provided with a spring actuated valve normally closing the orifice of the gas passage and co-acting with said valve head.

5. A gas regulator comprising a casing, and a fitting detachably connected therewith and with which gas inlet and outlet pipes are connected; and gas feed control means mounted upon said fitting and comprising valve means, and a swinging arm entering the casing and detachable therefrom with the fitting, there being a diaphragm in the casing provided with an extension having an opening loosely receiving said arm when in the casing.

In testimony whereof, I have signed my name to this specification in the presence of two subscribing witnesses.

JAMES R. RICKETTS.

Witnesses:
A. L. MOULTON,
D. A. JACOBS.